United States Patent
Reddy et al.

(10) Patent No.: US 9,787,622 B2
(45) Date of Patent: Oct. 10, 2017

(54) SYSTEM AND METHOD PROVIDING PROXIMITY BASED NOTIFICATIONS TO ELECTRONIC DEVICES

(71) Applicant: JULY SYSTEMS INC, Burlingame, CA (US)

(72) Inventors: Rajesh Reddy, Burlingame, CA (US); Balamurugan Rathinasabapathy, Burlingame, CA (US); Alok Menon, Burlingame, CA (US)

(73) Assignee: JULY SYSTEMS INC, Burlingame, CA (US)

(*) Notice: Subject to any disclaimer, the term of this patent is extended or adjusted under 35 U.S.C. 154(b) by 29 days.

(21) Appl. No.: 14/882,310

(22) Filed: Oct. 13, 2015

(65) Prior Publication Data

US 2017/0104708 A1 Apr. 13, 2017

(51) Int. Cl.
| | |
|---|---|
| H04W 24/00 | (2009.01) |
| H04L 12/58 | (2006.01) |
| H04W 4/02 | (2009.01) |
| H04W 4/14 | (2009.01) |
| H04W 12/06 | (2009.01) |

(52) U.S. Cl.
CPC ............ *H04L 51/20* (2013.01); *H04W 4/021* (2013.01); *H04W 4/14* (2013.01); *H04W 12/06* (2013.01)

(58) Field of Classification Search
CPC ........ H04L 51/20; H04W 12/06; H04W 4/14; H04W 4/021
USPC .............................. 455/456.1–456.3; 338/338
See application file for complete search history.

(56) References Cited

U.S. PATENT DOCUMENTS

| | | | | |
|---|---|---|---|---|
| 2012/0102091 | A1* | 4/2012 | Rao | H04L 51/00 709/203 |
| 2014/0301270 | A1* | 10/2014 | Johnsson | H04W 76/021 370/328 |
| 2016/0142366 | A1* | 5/2016 | Kant | H04L 61/106 370/338 |

* cited by examiner

*Primary Examiner* — Marcos Batista
(74) *Attorney, Agent, or Firm* — Symbus Law Group, LLC; Clifford D. Hyra

(57) ABSTRACT

System, method and electronic device providing proximity based communication and notification are disclosed. Presence of the electronic device is detected in a pre-defined area according to a detection methodology. The electronic device is then engaged according to an availability of identification details of the electronic device. The electronic device receives one time authentication request to collect the business identity and map it with the network identity. The business identity of the electronic device is verified and contact details of the electronic device are obtained. Subsequently when the electronic device enters the proximity range of a WiFi network, the system identifies its presence. The system identifies the contact details of the device based on the mapping of the network identity and business identity of the electronic device. The system sends multi-mode message communications to the electronic device based on defined proximity rules. The proximity rules can also be defined in such a way that the system sends multi-mode message communications to the electronic devices of the business.

26 Claims, 11 Drawing Sheets

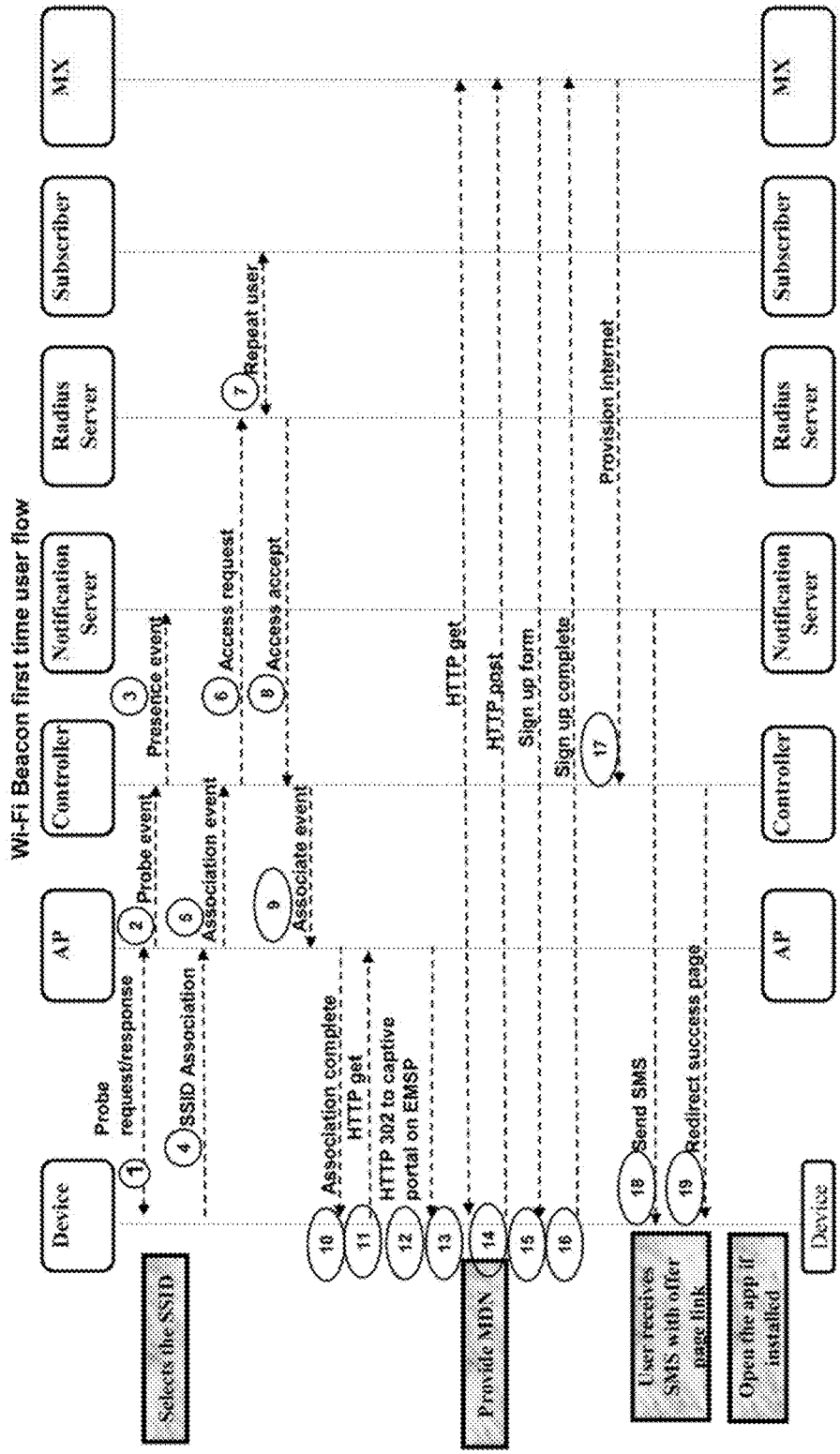

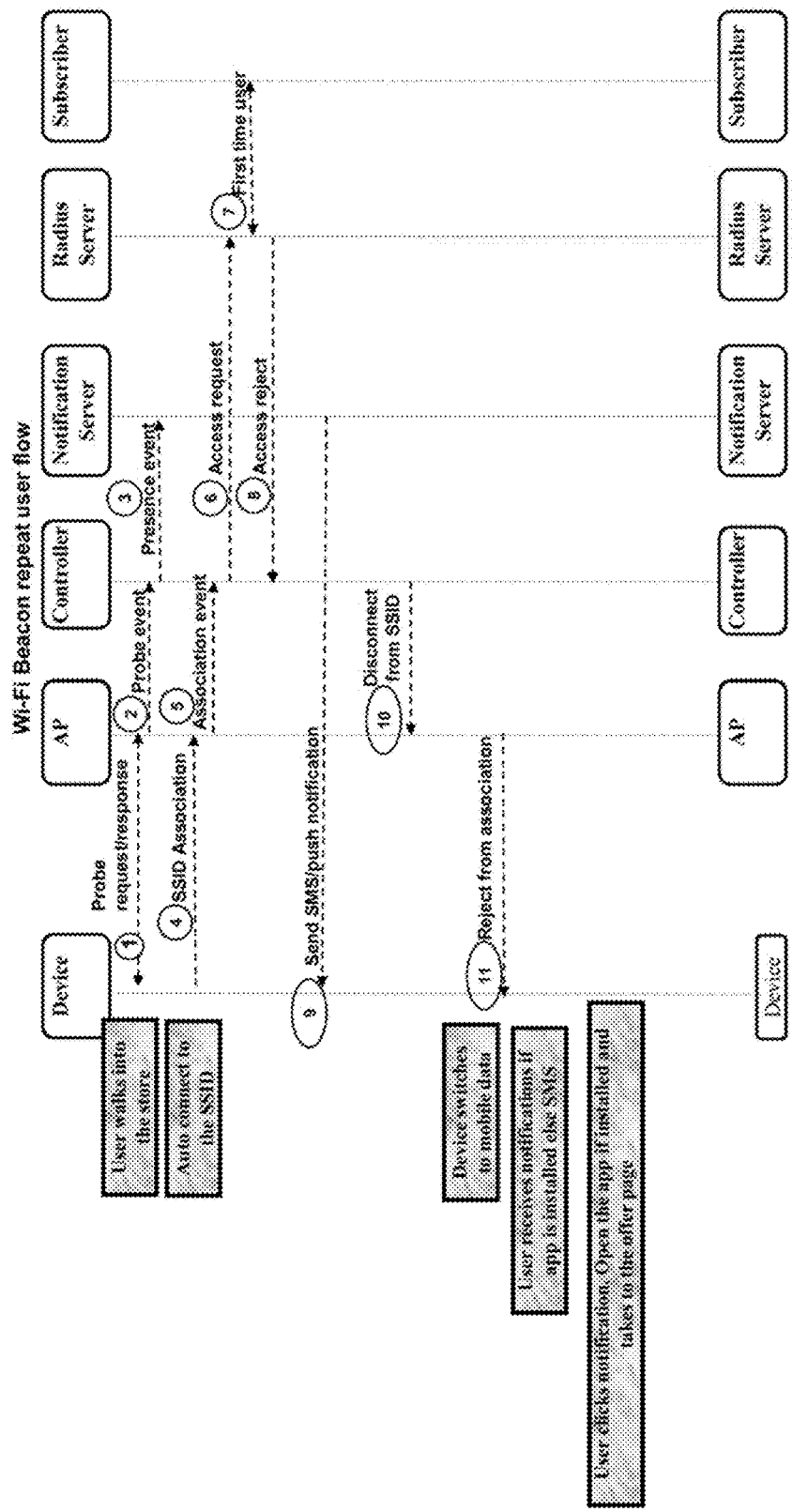

SYSTEM AND METHOD PROVIDING PROXIMITY BASED NOTIFICATIONS TO ELECTRONIC DEVICES

CROSS-REFERENCE TO RELATED APPLICATIONS AND PRIORITY

The present application does not claim priority from any patent application.

TECHNICAL FIELD

The present disclosure in general relates to a proximity based detection and engagement of electronic devices. More particularly, the present disclosure relates providing the proximity based notification to the electronic devices.

BACKGROUND

With more number of competitors in market, promotion of business services/activities has become an important aspect of an organization's daily routine activities. The organizations are bound to offer additional services pertaining to a user's need and comfort for a purpose of engaging user and then promoting business offers manually. These days, free Wi-Fi connectivity is provided by many entities such as cafe, airport, and shopping, malls. By providing an additional benefit of Internet connectivity, the entities are able to attract and retain users in their premises for longer periods of time. Even the users prefer to visit locations, where such additional services may be easily accessed.

So far, the free Internet access provided by the entities has only helped in attracting more number of users and for a longer time. However, this additional cost investment has not resulted in providing any additional benefits to the organizations. The organizations may only use the user details for an analytical purpose. Providing free Wi-Fi has not helped the organizations effectively communicate and engage with their users.

SUMMARY OF THE INVENTION

This summary is provided to introduce aspects related to system(s), methods) and electronic device for providing proximity rules based user engagement and notifications to both end user electronic devices and business and the aspects are further described below in the detailed description. This summary is not intended to identify essential features of the claimed subject matter nor is it intended for use in determining or limiting the scope of the claimed subject matter.

The present disclosure relates to method for establishing a proximity based communication with one or more electronic device. The method being performed by one or more processors. The method comprises receiving information regarding the presence and location of the one or more electronic device in a pre-defined area. The one or more electronic device is detected based on at least one detection methodology. The method further comprises engaging the one or more electronic device according to an availability of identification details of the one or more electronic device, verifying the one or more electronic device thereby receiving contact details of the one or more electronic device based on the engagement and sharing with the one or more electronic device an authentication request for establishing a connection with a service platform. The authentication request is shared based on the identification details. The method further comprises establishing the connection with the service platform in accordance with the authentication request. The connection allows the service platform to map the network identity of one more electronic device with the business identity of the same one or more electronic devices and hence allow the service platform to share multi-mode communication messages with the one or more electronic device.

The present disclosure also relates to a system for establishing a proximity based communication with one or more electronic device. The system comprises a processor and a memory coupled to the processor. The memory is configured to store a plurality of modules to be executed by the processor. The plurality of modules are configured to receive information regarding a presence and location of the one or more electronic device in a pre-defined area. The one or more electronic device are detected based on at least one detection methodology. The plurality of modules are further configured to engage the one or more electronic device according to an availability of identification details of the one or more electronic device, verify the one or more electronic device thereby receiving contact details of the one or more electronic device based on the engagement and sharing with the one or more electronic device an authentication request for establishing a connection with a service platform. The authentication request is shared based on the identification details. The plurality of modules are further configured to establish the connection with the service platform in accordance with the authentication request. The connection allows the service platform to map the network identity of one more electronic device with the business identity of the same one or mare electronic devices and hence allow the service platform to share multi-mode communication messages with the one or more electronic device.

The present disclosure also relates to a method for establishing a proximity based communication with one or more electronic device. The system comprises a processor and a memory coupled to the processor. The memory is configured to store a plurality of modules to be executed by the processor. The plurality of modules are configured to receive an information regarding the presence and location of one or more electronic device in a pre-defined area based on a pre-stored identification details of the one or more electronic device and establish the connection with a service platform based on the pre-stored identification details. The connection allows the service platform to map the network identity of one more electronic device with the business identity of the same one or more electronic devices and hence allow the service platform to share multi-mode communication messages with the one or more electronic device.

The present disclosure also relates to a method facilitating a proximity based communication. The method being performed by one or processors. The method comprises entering into a proximity range of a connectivity infrastructure in a system in a pre-defined area, associating with a service platform of the system for establishing a connection and receiving multi-mode communication messages from the service platform after the connection is established.

The present disclosure also relates to an electronic device facilitating a proximity based communication. The electronic device comprises a processor and a memory coupled to the processor. The memory is configured to store a plurality of modules to be executed by the processor. The plurality of modules are configured to enter into a proximity range of a connectivity infrastructure in a system in a pre-defined area, associate with a service platform of the system for establishing a connection and receive multi-mode communication messages from the service platform after the connection is established.

The present disclosure also relates to a system for establishing a proximity based communication with one or more electronic device. The method being performed by one or more processors. The method comprises receiving an information regarding the presence and location of one or more electronic device in a pre-defined area based on a pre-stored identification details of the one or more electronic device and establishing the connection with a service platform based on the pre-stored identification details. The connection allows the service platform to map the network identity of one more electronic device with the business identity of the same one or more electronic devices and hence allow the service platform to share multi-mode communication messages with the one or more electronic device.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

FIGS. 7a and 7b shows a sequence diagram of exemplary embodiment of proximity based presence detection in an enterprise.

DETAILED DESCRIPTION

While aspects of described system and method for establishing a proximity based communication with one or more electronic devices may be implemented in any number of different computing systems, environments, and/or configurations, the embodiments are described in the context of the following exemplary system.

The present description also relates to an electronic device facilitating a proximity-based communication with a system. The electronic device is connected to the system by at least one connecting methodology. The electronic device shares identity details while getting connected to the system. After the connection is established with the system, the electronic device receives an authentication request along with a form from a service platform. The service platform is a part of the system. The authentication request is received in accordance with the identification details. The electronic device can accept the authentication request and the user of the device can provide the authentication details and can receive multi-mode communication messages from the system.

Figure 1A:
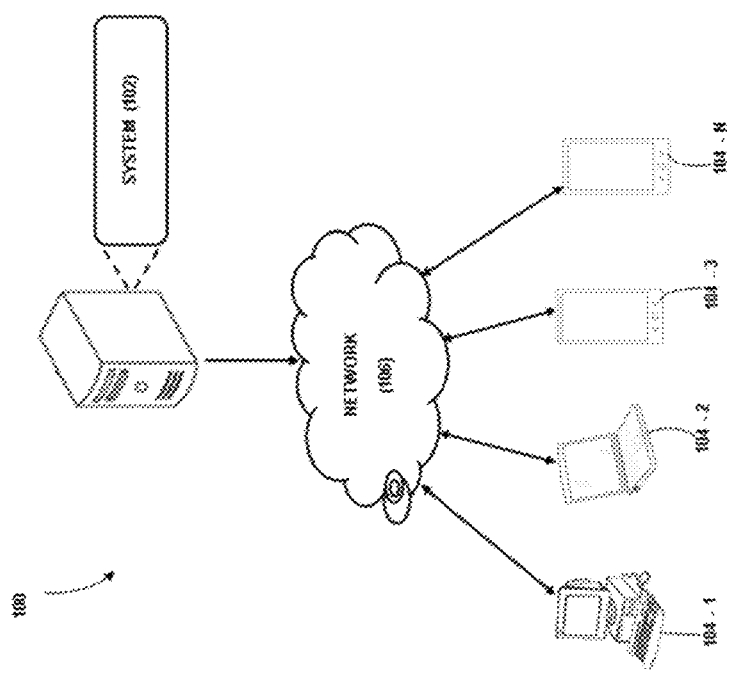
FIG. 1a illustrates a network implementation of a system for establishing a proximity based communication with one or more electronic devices, in accordance with an embodiment of the present subject matter.

Referring now to FIG. 1a, a network implementation 100 of system 102 for establishing a proximity-based communication with one or more electronic devices is shown. For the ease of description, the one or more electronic devices will be referred as an electronic device. The presence of the electronic device is detected in a predefined area according to at least one detection methodology. The electronic device is associated with the WiFi network according to the availability of identification details. After the association, the electronic device is identified and contact details are received by the system 102. Based on the verification, if the electronic device is not found to be associated with a business user identity, an authentication request for identifying the business user identity of the electronic device is shared with the electronic device. When the electronic device accepts the authentication request, the authentication details are validated and a mapping of the electronic device (the Wi-Fi mac address) and the business identity of the user of the electronic device is established. The service platform integrated with system 102 or present in the system 102, may now share multi-mode messages with the electronic device. The service platform may also send notifications to the business by means of sending multi-mode messages (SMS, email, Push Notifications and API calls) based on defined proximity rules.

Figure 1B:
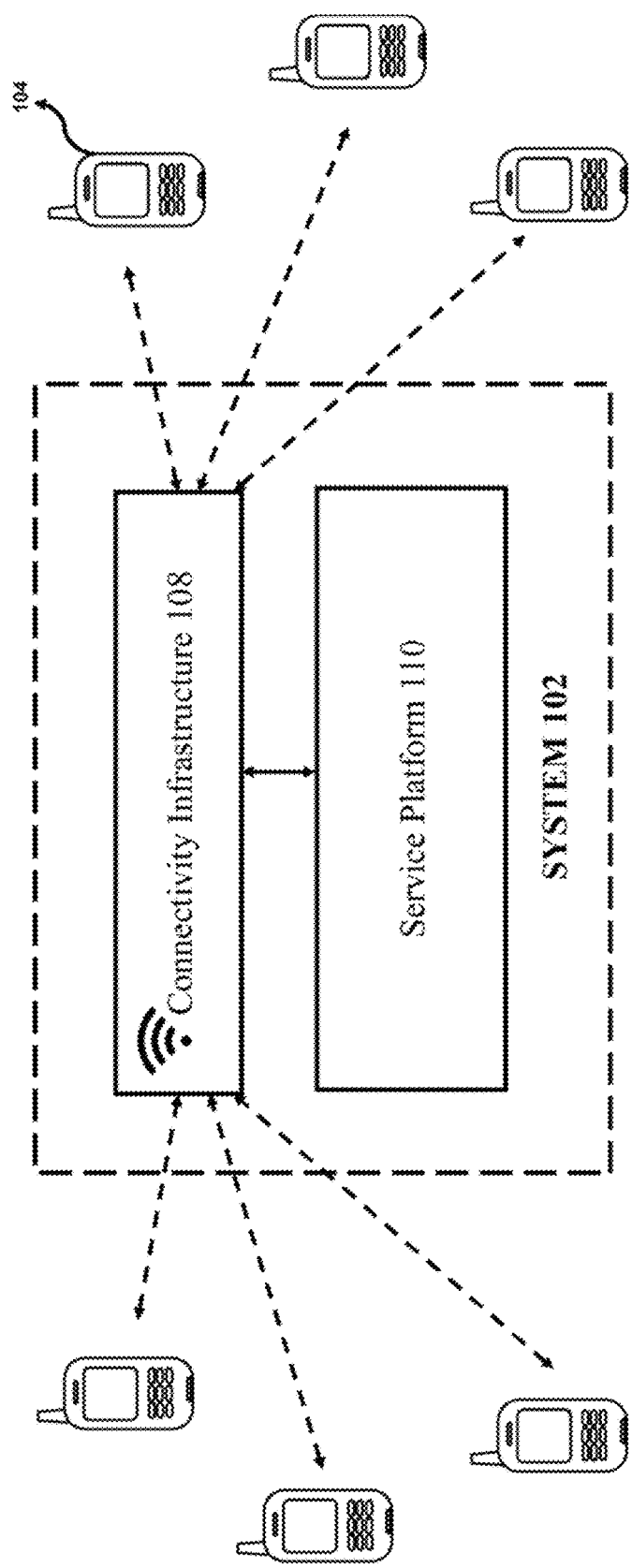
FIG. 1b illustrates an exemplary connectivity flow between the system and the electronic device, in accordance with an embodiment of the present subject matter.

FIG. 1b provides an exemplary flow of communication between the system 102, and the electronic device(s) 104. The electronic device 104 may establish the connection though a connectivity infrastructure 108 (connectivity system). The connectivity infrastructure comprises a Wi-Fi infrastructure 108. The communication between the system 102 and the electronic device 104 is further supported by a service platform 110 generating a captive portal to be managed within the electronic device 104. The detail of the components of system 102 is explained in later sections of the detailed description.

Figure 1C:
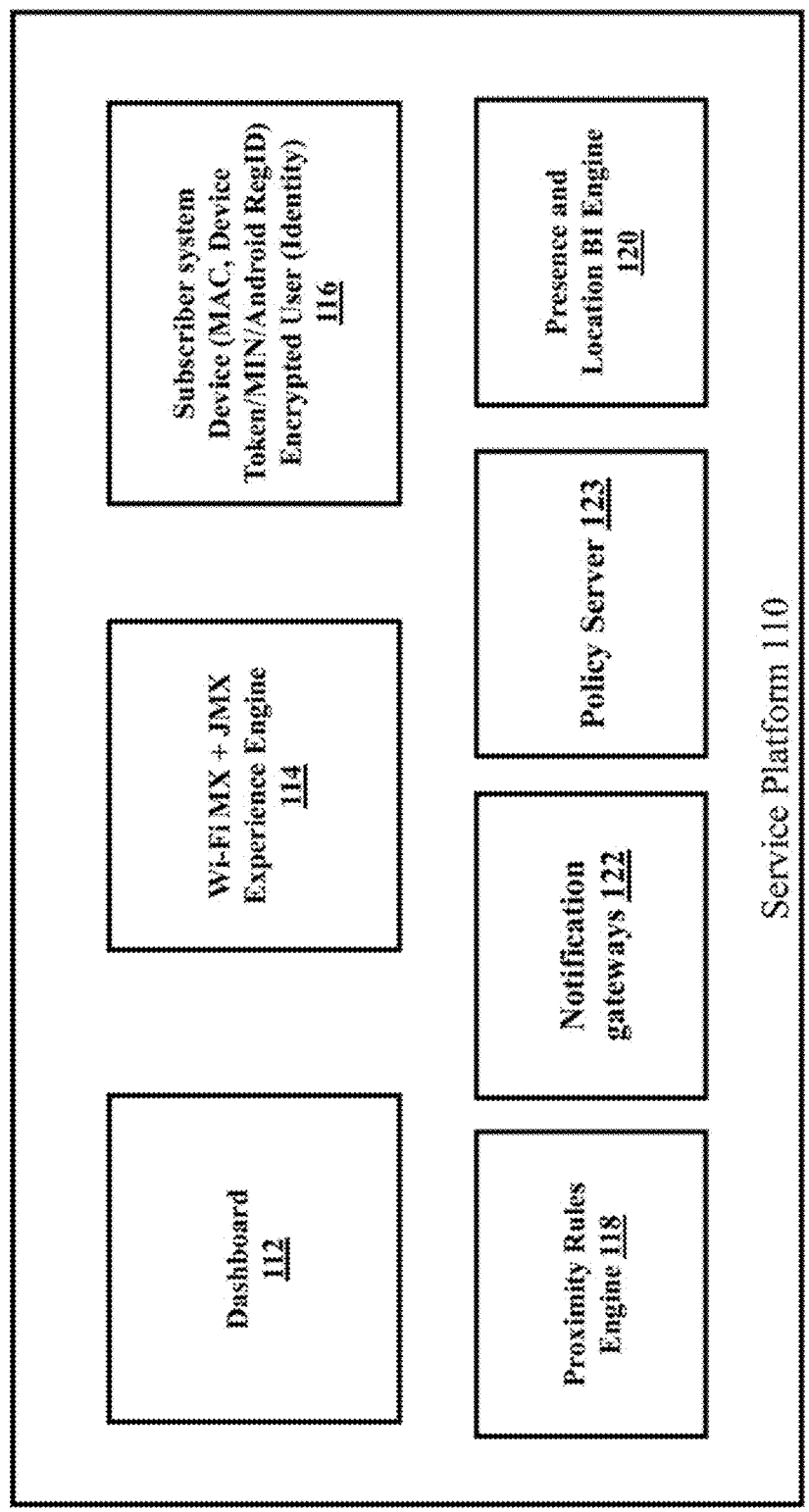
FIG. 1c illustrates details of components present in a service platform associated with the system, in accordance with an embodiment of the present subject matter.

Referring to FIG. 1c, components of the service platform 110 are shown. The service platform comprises a dashboard 112, a Wi-Fi MX+JMX experience engine 114, subscriber system comprising device MAC address, device token or Android registration id, Mobile Identity number (MIN) and encrypted user identity. The service platform 110 further comprises presence and location BI engine 120, notification gateways 122, Policy Server 123 and Proximity Rules engine 118. Details of components of the service platform 110 are described in later sections.

The Wi-Fi-MX 114 allows visitors to engage with location specific portal called Experience Zones through the Wi-Fi network or the cellular network. Each experience zone from the experience zones provides the visitor with a menu of services and content specific to a Business organization and relevant to location of the predefined area. The location specific portal also serves as a gateway for visitors to gain Internet access over the W-Fi.

The Wi-Fi MX and the JMX 114 provides an easy to use visual tool to create compelling and powerful mobile experiences and provide a runtime for the mobile experiences.

The Dashboard 112 is the landing section of Wi-Fi Beacon. In the Dashboard 112, the user can find tools to configure network/locations, onboard users/devices, setup his native apps so that push notifications can be sent to the native apps, define proximity rules, access activity reports and view the activity map.

Still referring to FIG. 1a, although the present subject matter is explained considering that the system 102 is implemented as an application on a server, it may be understood that the system 102 may also be implemented in a variety of computing systems, such as a laptop computer, a desktop computer, a notebook, a workstation, a server, a network server, and the like. In one implementation, the system 102 may be implemented in a cloud-based environment. It is understood that the system 102 accesses the location and presence information of multiple users through one or more user devices 104-1, 104-2 . . . 104-N, the user devices 104 (further referred as an electronic device) collectively referred to as a user device 104 (electronic, device) through the network 106. Examples of the user devices 104 may include, but are not limited to, a portable computer, a personal digital assistant, a handheld device, and a workstation. The user devices 104 are communicatively coupled to the system 102 through a network 106.

In one implementation, the network 106 can be a wireless network. The network 106 can be implemented as one of the different types of networks, such as intranet, local area network (LAN), wide area network (WAN), the Internet, and the like. The network 106 may either be a dedicated network or a shared network. The shared network represents an association of the different types of networks that use a variety of protocols, for example, Hypertext Transfer Protocol (HTTP). Transmission Control Protocol/Internet Protocol (TCP/IP), 802.11 Protocol and it's variants, Wireless Application Protocol (WAP), and the like, to communicate with one another. Further the network 106 may include a variety of network devices, including routers, bridges, servers, computing devices, storage devices, and the like.

Figure 2:
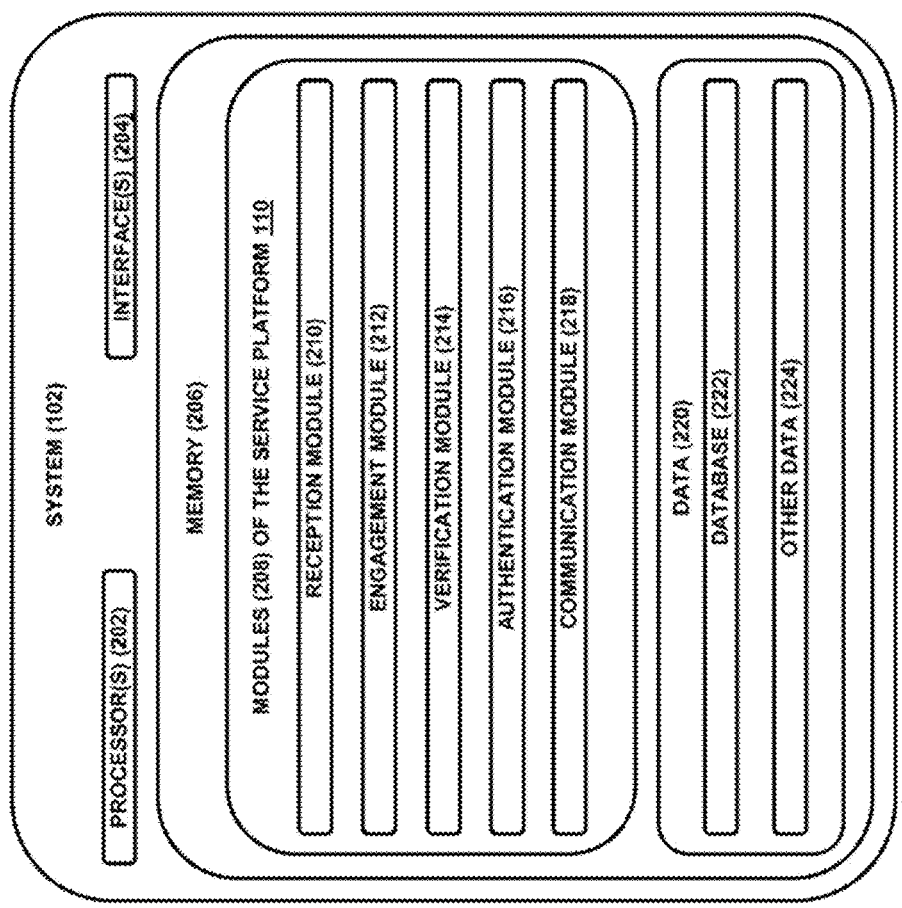
FIG. 2 illustrates modules of a system for establishing a proximity based communication with one or more electronic devices, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204 (herein a configurable user interface), and a memory 206. At least one processor 202 may be implemented as one or more microprocessors, microcomputers, microcontrollers, digital signal processors, central processing units, state machines, logic circuitries, and/or any devices that manipulate signals based on operational instructions. Among other capabilities, at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired net-works, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 222.

The modules 208 include routines, programs, objects, components, data structures, etc., which perform particular tasks, functions or implement particular abstract data types. In one implementation, the modules may include a reception module 210, an engagement module 212, a verification module 214, an authentication module 216, and a communication module 218. Other modules may include programs or coded instructions that supplement applications and functions of the system 102.

The data 220, amongst other things, serves as a repository for storing data processed, received, and generated by one or more of the modules. The data 220 may also include a database 222, and other data 224. The other data 224 may include data generated as a result of the execution of one or more modules.

Figure 3A:
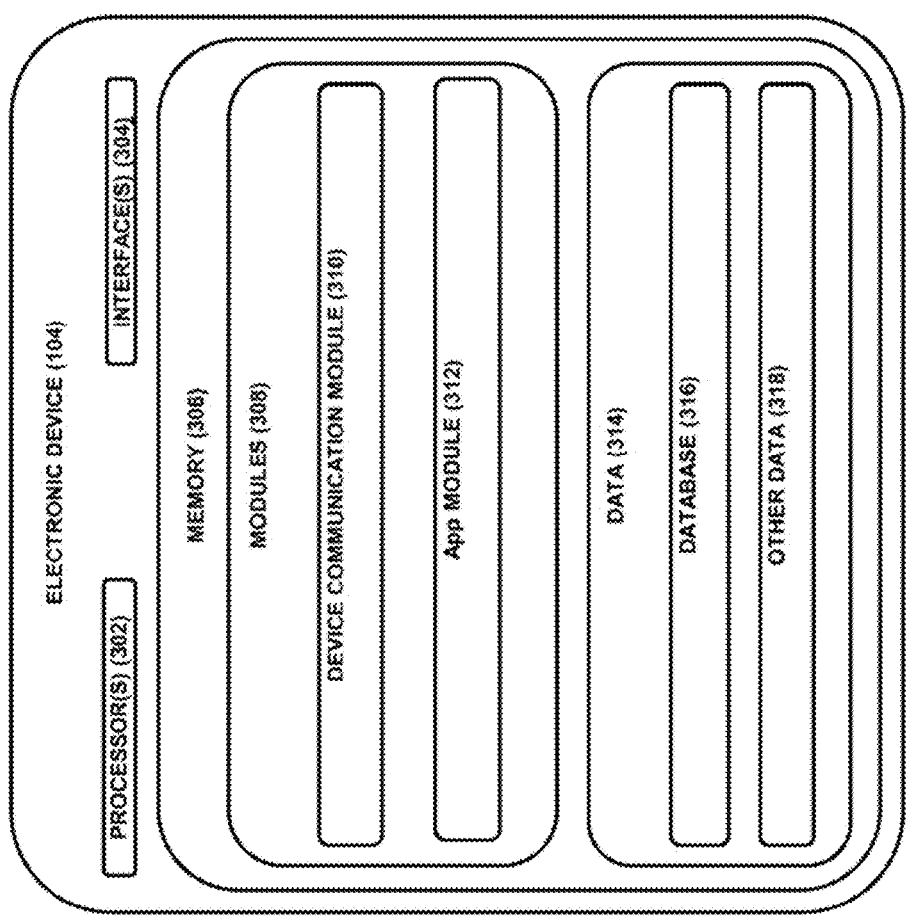
FIGS. 3a and 3b illustrates modules of electronic device facilitating a proximity based communication in an enterprise, in accordance with an embodiment of the present subject matter.

Referring to FIG. 3a, the electronic device 104 comprises a processor 302, an interface 304 and a memory 306. Modules 308 comprises a device communication module 310 and an App module 312. The electronic device 104 may optionally comprises a data 316, a database 314 and other data 318.

In an example, the device communication module 310 comprises a GSM/CDMA radio module, Wi-Fi Radio Module, and a Bluetooth radio module.

Figure 3B:
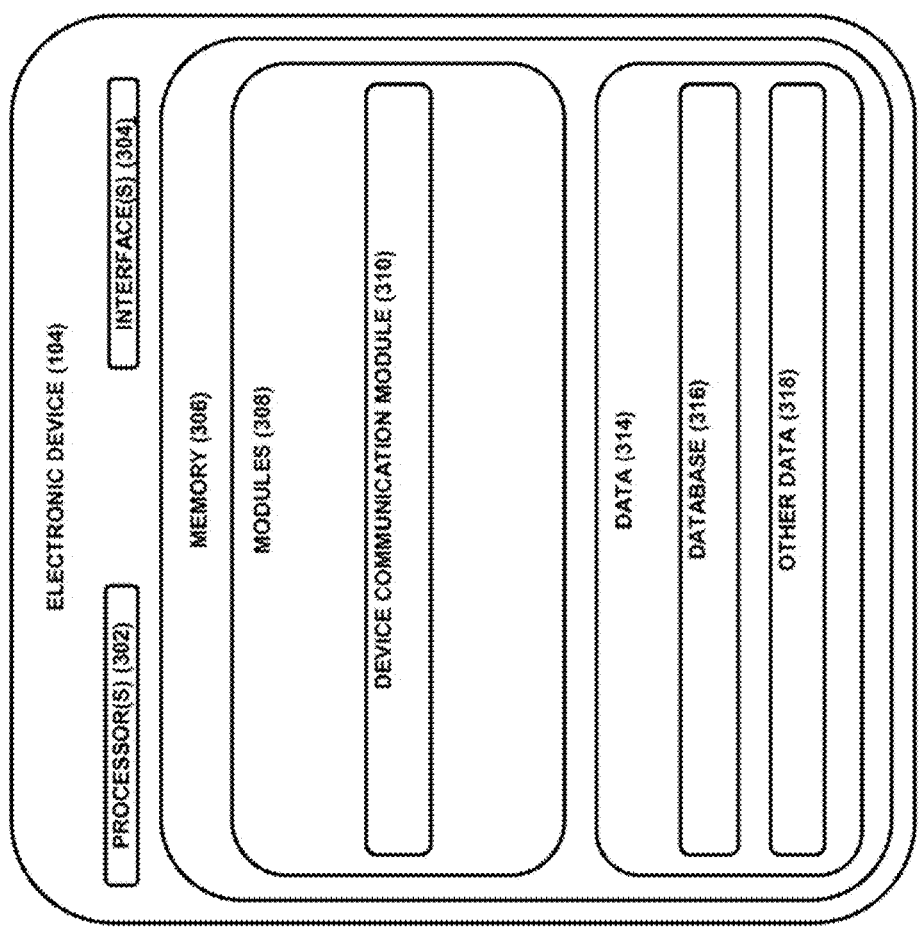

In FIG. 3b, the electronic device without the App module 312 is shown. The electronic device 104 without the App module 312 receives notifications through the SMS mode and or email mode of communication.

The reception module 210 is configured to receive an information regarding a presence and location of the electronic device 104 from the connectivity infrastructure 108 in a predefined area. First time presence of the electronic device 104 is detected by the connectivity infrastructure 108 according to at least one detection methodology. The detection methodology comprises detection through a Wi-Fi infrastructure supporting Wi-Fi connectivity. In subsequent visits to the pre-defined area, the electronic device is detected based on a Wi-Fi connection negotiation request as part of at least one detection methodology. The Wi-Fi connection negotiation request comprises a probe request, a Wi-Fi handshake, service discovery request, provision discovery request, request/response action frames and the like.

The Wi-Fi infrastructure comprises at least one of an Access Point (AP), SSID as broadcasted by the Wi-Fi network, probe and communications requests made by the electronic device 104, wireless controllers to manage the probe and communication requests and send presence events to the service platform. It may be understood by a person ordinarily skilled in the art, associating a captive portal with an SSID is one of the ways in which the service platform maps the electronic device and the business identity of the device.

The service platform 110 also referred to as "Wi-Fi beacon server software" is hosted on a set of servers running in the cloud. In an example, the set of servers comprises Linux servers, Solar servers, Windows and alike.

In an example embodiment, when the electronic device 104 enters first time (called as first visit) into the predefined area, the system 102 allows the electronic device 104 to connect to the Wi-Fi network of the predefined area. The Wi-Fi MX+JMX engine 114 uses the connectivity infrastructure 108 to allow the electronic device 104 to get connected to the Wi-Fi network. When the electronic device 104 gets connected, the reception module 210, receives the information regarding the presence and location (connectivity) of the electronic device 104 from the WiFi infrastructure (Streaming Presence/Location updates 620)

The reception module when receiving presence information of electronic devices from the WiFi infrastructure, it receives the location information and the network identity of the electronic device. The network identity of the electronic device is the Media Access Control (MAC). The network identification details are further received by the subscriber system 116. The subscriber system persists the Wi-Fi MAC address of the electronic device for future identification of the electronic device entering the predefined area.

In case of subsequent visits, the reception module 210 continues to receive presence and location information of the electronic device 104 based on the Wi-Fi connection negotiation requests as explained above.

In an embodiment, the reception module 210 receives information regarding a presence detection of the electronic device 104 based on the parameters received from the Wi-Fi-infrastructure such as x, y and z co-ordinates, latitude and longitude information, signal strength, signal accuracy, location information and access point information etc. regardless of whether the device is connected to the Wi-Fi infrastructure or not. The Wi-Fi infrastructure is used as a signaling channel to detec the presence of the electronic device 104. Such a presence detection method without requiring Wi-Fi connectivity avoids an unwanted exhaustion of bandwidth due to continuous connectivity of the electronic device 104 to the Wi-Fi network.

Based on the presence detection, the electronic device 104 is engaged with the service platform 110 associated with the system 102. The engagement is performed by the engagement module 212 according to an availability of identification details of the electronic device 104. The availability of identification details includes pre-stored identification details corresponding to past connection establishment (first time connectivity) with the electronic device 104 or the identification details requested for the first time. The first time requested identification details can be stored for presence detection in case of subsequent visits of the electronic device 104.

For the first visit of the electronic device 104, as part of engagement process, the engagement module 212 shares a form with the electronic device 104 as the authentication request. The form comprises one or more entries to be filled by the electronic device 104. The form is shared through a captive portal of the system 102. The captive portal can be a HTTPS (SSL) based portal.

The verification module 214 verifies the electronic device 104 by using the identification details. During verification, the verification module 214 receives contact details of the electronic device 104. The contact details comprises at least one of a contact number of the electronic device 104 and an email id of a user of the electronic device 104. The verification module 214 integrates the system 102 with a Back-end system for checking details of the user. If the user already exists, the system 102 collects information or details (except app identity details) of the user form the Back-end system and maps the business identity with network identity of the electronic device 104 in the system. If the user details are not present in the back-end system, user details are collected though a form which is shared with electronic device 104 and the business identity is then created and mapped to the network identity of the electronic device 104 in the system 102 based on the details collected in the form.

The service platform 110 while sending the authentication request, requests for business identity of the electronic device 104. The business identity as shared, is mapped to pre-stored data of the electronic device 104 of the service network. The electronic device 104 is further authenticated according to mapping.

Once the electronic device 104 is verified, the service platform 110 through the authentication module 216 shares an authentication request with the electronic device 104. The authentication request when accepted by the electronic device 104, provides a consent to the system 102 for sending multi-mode communication messages from the service platform. The service platform 110 is involved in generating a captive portal to be managed within the electronic device 104. The captive portal is generated in accordance with the identification details and authentication request.

The communication module 218 through the notification engine 124 sends the multi-mode communication messages to the electronic device 104. The multi-mode communication messages comprise at least one of a Short Message Service (SMS), an app mode message communication (usually referred to as push notification), email mode communication and API calls. The SMS and app mode message is sent through the notification gateways 122.

The captive portal in the electronic device 104 checks if the electronic device 104 has an installed native app with the App Module 312 built using the native SDK of the service platform. If the electronic device 104 has the app, the captive portal invokes the app by passing the network identification details (MAC address) of the electronic device 104 to the native app. When the native app is launched, the App Module 312 built using the native SDK of the service platform sends the network identification to the system 102.

The captive portal tries to launch the app using an app URL scheme by passing the mac address to the app. The app sends its own app identity, the network identity (MAC address) it received from the captive portal to the service platform 110. The service platform merges the network identity of the electronic device 104, the business identity of the electronic device 104 and the app identity of the electronic device. After the mapping, the service platform 110 will be able to detect a presence of the app and may decide to send push notifications through the app mode of communication instead of SMS based on the proximity rule configuration.

The system 102 collects and associates the network identification of the electronic device 104, an android registration id (in case the electronic device is running android Operating System), device token (in case the electronic device is running iOS Operating System) in order to send push notifications to the electronic device 104 from the service platform. The service platform 110 may send push notifications through the communication module 218.

The communication module 218 also checks the version of the app while sharing the multi-mode messages. The communication module 218 is capable of determining the app capabilities based on the app version installed on the electronic device 104 and customize the notifications based on the app capabilities. The communication module 218 can send SMS along with a URL.

The multi-mode messages are sent according to the business identity of the electronic device 104 shared under the authentication request. The user may also customize type of multi-mode messages to be shared according to business requirements.

In another embodiment, the system 102 also establishes proximity based communication with the electronic device 104. The communication is established in reference to the identification details stored when the presence of the electronic device 104 was detected first time by the reception module 210. The identification details stored first time may be referred as the pre-stored identification details. The presence is detected without requiring the electronic device 104 to be connected to the Wi-Fi network of the system 102.

In an example embodiment, let a user A enters into a shopping mall (pre-defined area). The user A might not be a first time visitor and the system 102 has pre-stored identification details. The reception module 210 receives information regarding the presence and location of the user A based on the Wi-Fi connection negotiation request. The Internet connectivity may be denied by the system 102 based on a customer configuration.

The end user may start receiving notifications initiated through multi-mode communication either push notification or SMS. For example, the user may receive a route map to a particular area of the store for picking, a pre-ordered parcel, or a list of shopping offers provided by a store in the pre-defined area.

The Policy server 123 is configured to check if the electronic device 104 is visiting first time or not. In case of a repeated visit, the Policy server 123 may decide to deny the electronic device the Wi-Fi network connectivity in case the device has been already associated and if such a configuration is enabled in the policy Server. The reception module 210 receives the presence and location information and MAC address of the electronic device 104. After the presence is detected, the engagement module 212 identifies the business identity of the electronic device 104, since the system 102 has pre-stored identification details of the electronic device 104.

Based on the pre-stored identification details system 102 may skip the step of verification and form filling for obtaining; authentication request from the electronic device 104. The communication module 218 can directly share multi-mode messages with the device based on the prior obtained consent during authentication request. The examples of the multi-mode messages may comprise a route map to a Store B, new offers available with the store and the like.

The communication module 218 uses the already stored contact details of the electronic device 104 and start sending the multi-mode communication messages. The multi-mode communication messages are customized according to the business requirements of the customer.

In accordance with another embodiment, the present description also provides the electronic device 104, proximity based communication with the system 102. The device communication module 310 receives a notification regarding an availability of the Wi-Fi network of the system 102 in the pre-defined area. The electronic device 104 can connect to the Wi-Fi network of the pre-defined area. The electronic device 104 is also required to share device identification details with the system 102. The identification details remains similar to what has been described for system 102 and are not explain to avoid redundancy.

Based on connectivity with the Wi-Fi network, the electronic device 104 receives an authentication request from the system 102. The authentication request is received so that the electronic device 104 may provide a consent for receiving multi-mode messages from the system 102. The multi-mode messages are received from the service platform associated with the system 102.

The multi-mode communication messages comprise at least one of a Short Message Service (SMS), an app mode message communication (push notification) or an email message and the like.

As part of the authentication request, the electronic device 104 is required to fill one or more entries in an authentication form. The filling of the one or more entries is done through the captive portal generated by the system 102 in the electronic device 104. The one or more entries comprise contact details of user of the electronic device, and consent of the user for receiving multi-mode messages.

Once the form is filled and submitted, the electronic device 104 can receive the multi-mode messages from the system 102.

Figure 4:
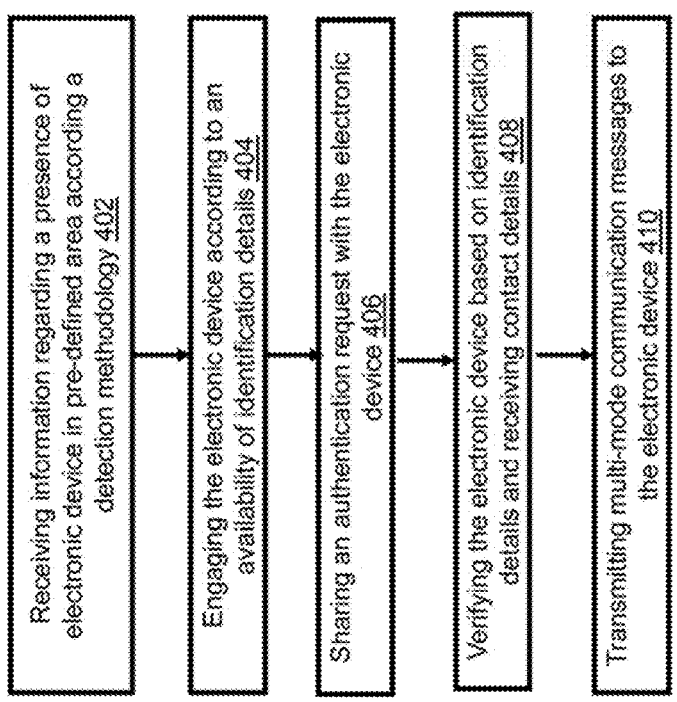
FIG. 4 shows a flow chart of method for establishing a proximity based communication with one or more electronic devices, in accordance with an embodiment of the present subject matter.

Referring now to FIG. 4, a method 400 for establishing the communication with one or more electronic devices is shown, in accordance with an embodiment of the present subject matter. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternate methods. Additionally, individual blocks may be deleted from the method 400 without departing from the spirit and scope of the subject matter described herein. Furthermore, the method can be implemented in any suitable hardware, software, firmware, or combination thereof. However, for ease of explanation, in the embodiments described below, the method 400 may be considered to be implemented in the above described media system 102 for establishing the communication with the electronic device 104.

At block 402, the information regarding a presence of the electronic device 104 in a pre-defined areas is received based on the at least one detection methodology. The information is received by the reception module 210.

At block 404, the electronic device 104 is engaged according to an availability of the identification details of the electronic device 104. The engagement is performed by the engagement module 212.

At block 406, the electronic device is verified thereby receiving contact details of the electronic device 104. The verification is performed by the verification module 214. The system 102 is integrated with a Back-end system storing the details of the user (other than app identity). If the user already exists, the reception module collects business identity related information from the Back-end system and establishes a mapping with the network identity of the electronic device. If the user details are not present in the back-end system, user details are collected though a form which is shared with electronic device 104 and the business identity is then created and mapped to the network identity of the electronic device 104 in the system 102 based on the details collected in the form.

At block 408, the authentication request is shared with the electronic device 104 for establishing the connection with a service platform associated with the system 102. The authentication request is shared based on the identification details. The authentication request is shared by the authentication module 216.

At block 410, the multi-mode communication message shared with the electronic device 104. The communication module shares the multi-mode messages.

Figure 5:
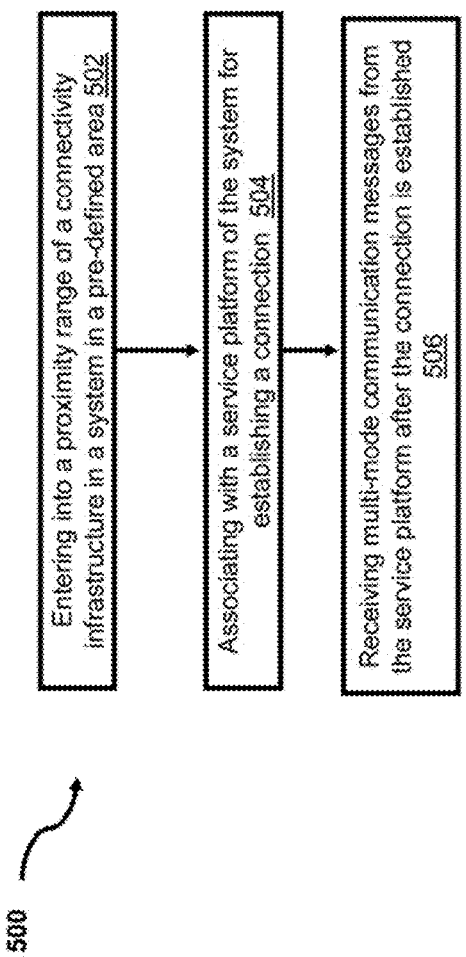
FIG. 5 provides a flow chart for a method facilitating a proximity based communication in an enterprise, in accordance with an embodiment of the present subject matter.

In accordance with FIG. 5, method 500 facilitating the communication in the electronic device 104 with the system 102 is shown.

At block 502, the method 500 provides optional connectivity to the electronic device 104 entering into a proximity range of the connectivity infrastructure in the system 102 in the pre-defined area. For a first time visit, the electronic device may connect to the service platform 110 of the system 102. The connectivity is supported by the device communication module 310.

At block 504, the method 500 provides associating the electronic device 104 with the service platform 110 of the system 102 for establishing the connection. The association is also supported by the device communication module 310.

At block 506, the multi-mode messages are received by the electronic device 104. The messages are received by the device communication module 310. The app mode messages are received by the app module 312.

The electronic device 104 also receives the authentication request from the service platform 110 of the system 102 if the electronic device is not found to be associated with a business user. The electronic device shares identification details through a form in the captive portal with the service platform 110.

Figure 6:
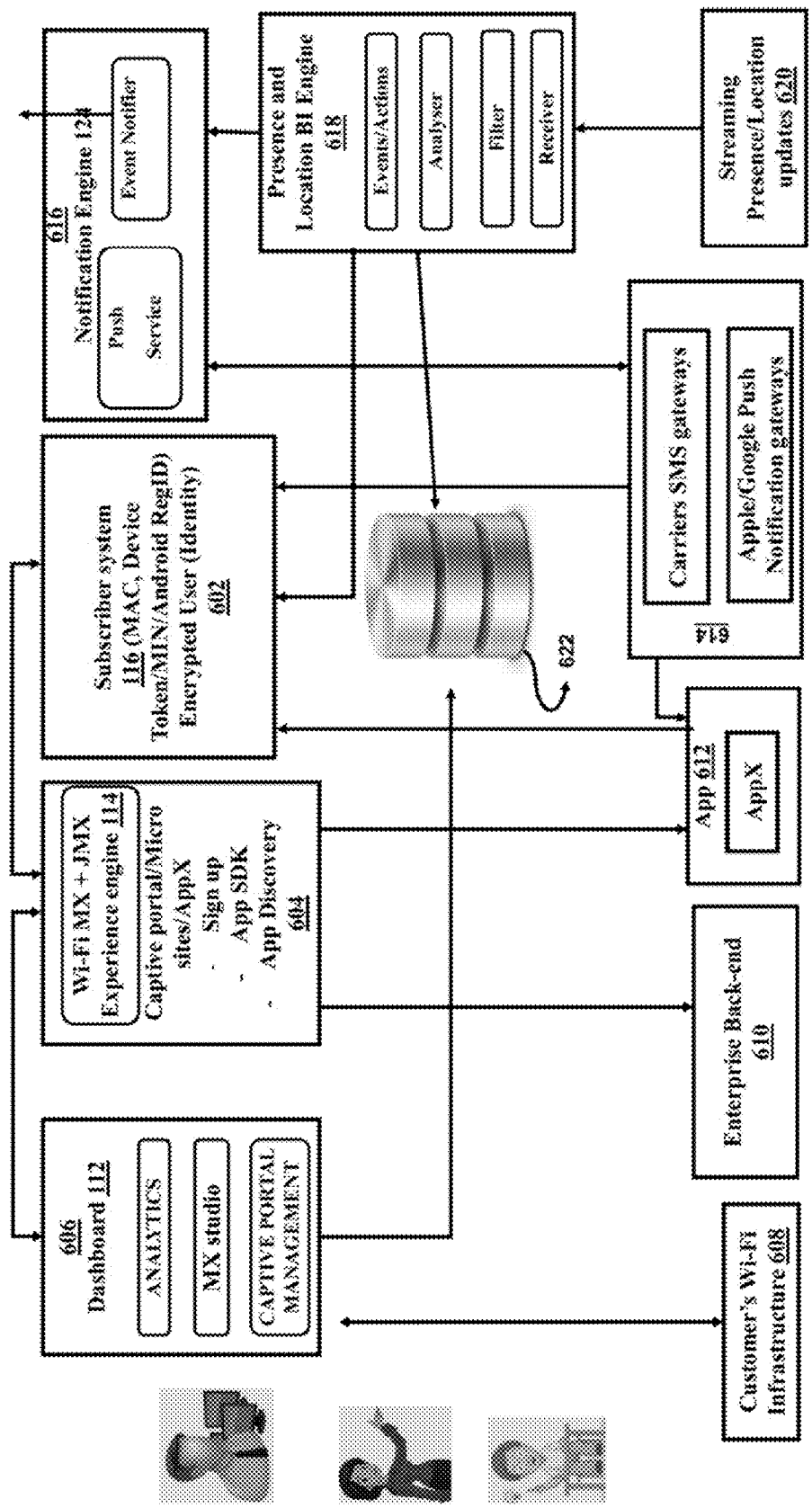
FIG. 6 provides an exemplary flow of communication between the system and the electronic device in an enterprise, in accordance with an embodiment of the present subject matter.

In accordance with an embodiment, FIG. 6 shows an exemplary flow of communication between the system 102 and electronic device 104. In block 602, a subscriber system 116 receives identification details such as MAC address, iPhone Device token/, android regID, MIN, and encrypted user idea thy through the Wi-Fi+JMX experience engine 114 in the connectivity infrastructure 108 of the system 102 in block 604. The block 604 further provides the generation of the captive portal to generate authentication request (sign up), for app SDK and app checking (discovery) in the electronic device 104. Block 606 is in communication with the block 604, a dashboard 112 of the service platform 110 is shown to provide analytics and to provide captive portal management and MX studio.

Block 606 and Block 618 are in communication with block 608 providing customer's Wi-Fi infrastructure. Block 610 provides an enterprise back-end in communication with the block 604. Block 612 is in communication with the block 604 to provide app experience to the electronic device 104 by the system 102. Block 614 shows the notification gateway 122 with one or more gateways. The block 614 is in communication with block 602 to provide experiences initiated through the block 612. Block 616 Shows the notification engine 124 in communication with the block 614 and provides the notification engine support to send notifications (Push service, SMS, Email and the Event notifier). The Event notifier notifies the external systems which have subscribed to receive location updates about the location of the electronic device 104 in the predefined area.

Presence and notification BI engine 120 in block 618 is in communication with the block 602 and notifies about the events/notifications received from the Wi-Fi infrastructure 608 and from block 620. In block 618 Analyzer processes the information and triggers appropriate notifications based on the proximity rules, the filter component filters unwanted location updates received for electronic devices for which the processing is not required. The blocks 606, and the block 618 save data in repository 622.

In another example embodiment, the system 102 may also be configured to import identification details (MAC details) of the one or more electronic devices in bulk. The bulk import may be used to track location (presence) of the one or more electronic devices in the pre-defined area according to the Wi-Fi negotiation connection request. For example, the system 102 deployed in a school may have 'n' number of electronic devices connected with the system 102. The system 102 stores in bulk, pre-defined identification details of the 'n' electronic devices. Now, the system 402 may act as a security system in the school (pre-defined area) to track if the 'n' students having the 'n' electronic devices are present in the school or not.

Referring to FIG. 7a, a sequence diagram for a first rime user engagement and notifications through the system 102 (including Wi-Fi beacon) is shown. In step 1, the system 102 receives a probe request or response form a user through the AP. In step 2, the system 102 the probe event is identified by the controller and a presence event is notified to a notification server in step 3.

In an alternate embodiment, in step 4 and 5, based on the SSD selection, SSID association is performed and association event is passed to the controller. In step 6 and 7, the access request from the first time user for using Wi-Fi connectivity comes to the system 402. In step 8, the system 102 accepts the request and allows the user to connect to the Wi-Fi infrastructure.

In step 9: the event is associated and the system 102 completes the association step 10. From steps 11 to 15, the system 102 generates the captive portal in the electronic device 104 and asks the user to sign up for sharing the details of the user.

In step 16, when the sign up is complete, the system starts sending multi-mode communication messages to the user in step 18. The user may receive SMS with offer page link. In step 19, the user is redirected to success page. The system 102 checks, if the user has a native app and may start sending push messages if the native app is present instead of sending SMS.

Referring to FIG. 7b, a repeat user engagement for establishing communication and sending notifications is shown. In step 1 the system 102 receives the probe request or Wi-Fi connection negotiation request from the repeat user. The probe event is sent to the controller and presence event is sent to the notification server in steps 2 and 3.

In steps 4 to 7, the system 102 identifies the user as the repeat user based on pre-stored details. The system 102 sends the sms and/or push notifications to the user based on pre-stored identification details in step 9. The SSID association event may happen based on the electronic device's network preference and an access request from the electronic device gets originated. In step 8, the access request is rejected if the customer configuration is enabled to deny SSID access for repeat user.

If the access request is rejected in step 8, the user is disconnected from the SSID in step 11 and association is rejected in step 11. The electronic device may decide to switch back to mobile data if the associate request was rejected. The user may receive notifications if the app is installed. In case the app is not installed, the user may receive the sms. User may click notification, opens the app and may access the offer page.

The written description describes the subject matter herein to enable any person skilled in the art to make and use the embodiments of the invention. The scope of the subject matter embodiments are defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

We claim:

1. A method comprising:
   detecting by a wireless infrastructure, a location or presence of one or more electronic devices based on one of a location or presence detection methodology;
   communicating to a service platform, one or more device identities of the one or more electronic devices, by the wireless infrastructure;
   associating through the service platform, the one or more device identities, with a business identity associated with a user of the electronic device stored in a back-end server:
      wherein it is optional for the one or more electronic devices to have an established connection with the service platform;
      wherein the device already has an app installed with a user app identity;
   if the service platform does not find an association of the one or more business identities for the one or more device identities of the one or more electronic devices:
      authenticating, by the user to serve details in a captive portal of the one or more electronic devices;
      automatically launching the app from the captive portal and passing the device identity received from the wireless infrastructure during the captive portal redirect to the app;
      sharing the device identity by the app along with the user app identity to the service platform in the authentication request, wherein the app uses the SDK provided by the service platform to achieve this communication to the service platform;
      launching the app in background when the one or more electronic devices are connecting to the wireless network, and associating the device identity of the device by sharing the IP address of the device to the service platform in the authentication request;
      performing a reverse IP lookup by the service platform to get the MAC address and associate the device identity, with the service platform maintaining the IP to MAC address mapping which it receives from the wireless infrastructure; and
      associating the newly collected business identity with the device identity by the service platform on successful completion of the authentication by the user of the one or more electronic devices; and
   responsive to a proximity of the one or more electronic devices identified with respect to the location, the service platform sends notifications to the one or more electronic devices through one or more communication channels the one or more electronic devices have access to but not limited to the wireless infrastructure used for the device presence or location determination.

2. The method as claimed in claim 1, wherein the at least one detection methodology comprises:
   a detection of the one or more electronic devices through a Wi-Fi network based connectivity,
   a detection due to Wi-Fi connection negotiation request between one or more electronic devices and the wireless infrastructure, wherein the Wi-Fi connection negotiation request comprises a Wi-Fi probe request, a Wi-Fi handshake, a service discovery request, provision discovery request, request/response action frames and the like and
   a detection according to one or more attributes passed by the wireless infrastructure about the one or more electronic devices in the Wi-Fi network, wherein the attributes can be the presence, dwell, absence, movement data (location), location and the like.

3. The method of claim 2, wherein the one or more electronic devices are detected through one or more access points and the presence of the same is passed to the service platform via the wireless infrastructure.

4. The method as claimed in claim 2, wherein the detection due to Wi-Fi network connectivity is based on a Service Set Identifier (SSID) broadcast by the Wi-Fi network.

5. The method as claimed in claim 1, wherein entering into a proximity range of a connectivity infrastructure in a pre-defined area comprising:
   connecting to the wireless infrastructure for a first time visit,
   negotiating with the wireless infrastructure (and not necessarily connect) for the subsequent visits,
   receiving an authentication request along with a form from the service platform, and
   sharing identification details in the form with the service platform.

6. The method as claimed in claim 1, wherein the device identity details comprise Media Access Control Address (MAC address) of the one or more electronic devices.

7. The method as claimed in claim 1, wherein the communication channels comprises at least one of a Short Message Service (SMS) mode message communication and an app mode message communication (Push Notification), an email mode message communication, an API based communication and the like.

8. The method as claimed in claim 7, wherein the app mode message communication comprises checking and detecting the version of the app while sending the app mode message communication.

9. The method as claimed in claim 1, wherein the establishing connection with the service platform comprises:
   detecting the one or more electronic devices through one or more Access Points (APs) in the Wi-Fi network, based on the identification details stored during the detection;
   identifying a repeated electronic device from the one or more electronic devices, wherein the repeated electronic device is identified according to the availability of the identification details; and
   applying a filtering mechanism to optionally deny Wi-Fi connectivity to repeated electronic devices while providing a Wi-Fi connectivity support.

10. The method as claimed in claim 1, comprising:
    collecting identification details of one or more electronic devices in bulk, and detecting the presence of the one or more electronic devices in the pre-defined area based on the pre-stored identification details of the one or more electronic devices and sending the notifications to the one or more electronic devices.

11. The method of claim 1, wherein authentication attributes include user details like mobile number, email address, user app identity and the like and optionally includes first name, last name, title, age, gender, business related tags and the like.

12. The method of claim 11 wherein, the user App identity refers to the actual identifier assigned to the app by the respective platforms like android, IOS and the like.

13. The method of claim 11, wherein the user App identity is designated by the OS (android, IOS, Windows etc.,) to a specific app in a specific device.

14. A system for establishing a proximity based communication with one or more electronic devices, the system comprising:
a service platform comprising:
a processor; and
at least one processor, the at least one processor being communicatively coupled to the at least one memory, the at least one processor being configured to execute instructions to:
detect by a wireless infrastructure, a location or presence of one or more electronic devices based on one of a location or presence detection methodology;
communicate to a service platform, one or more device identities of the one or more electronic devices, by the wireless infrastructure;
associate through the service platform, the one or more device identities, with a business identity associated with a user of the electronic device stored in a back-end server:
wherein it is optional for the one or more electronic devices to have an established connection with the service platform;
wherein the device already has app installed with a user app identity;
if the service platform does not find an association of the one or more business identities for the one or more device identities of the one or more electronic devices:
authenticate, by the user to serve details in a captive portal of the one or more electronic devices;
automatically launch the app from the captive portal and passing the device identity received from the wireless infrastructure during the captive portal redirect to the app;
share the device identity by the app along with the user app identity to the service platform in the authentication request wherein the app uses the SDK provided by the service platform to achieve this communication to the service platform;
launch the app in background when the one or more electronic device are connecting to the wireless network, and associating the device identity of the device by sharing the IP address of the device to receive platform in the authentication request; and
perform a reverse IP lookup by the service platform to get the MAC address and associates the device identity, the service platform maintaining the IP to MAC address mapping which it receives from the wireless infrastructure; and
associate the newly collected business identity with the device identity by the service platform on successful completion of the authentication by the user of the one or more electronic devices; and
responsive to a proximity of the one or more electronic devices identified with respect to the location, the service platform sends notifications to the one or more electronic devices through one or more communication channels the one or more electronic devices have access to but not limited to the wireless infrastructure used for the device presence or location determination.

15. The system as claimed in claim 14, wherein the at least one detection methodology to:
detect one or more electronic devices through a Wi-Fi network based connectivity,
detect due to Wi-Fi connection negotiation request between one or more electronic devices and the wireless infrastructure, wherein the Wi-Fi connection negotiation request comprises a Wi-Fi probe request, a Wi-Fi handshake, a service discovery request, provision discovery request, request/response action frames and the like, and
detect according to one or more attributes passed by the wireless infrastructure about the one or more electronic devices in the Wi-Fi network, wherein the attributes can be the presence, dwell, absence, movement data (location), location and the like.

16. The system of claim 15, wherein the one or more electronic devices are detected through one or more access points and the presence of the same is passed to the service platform via the wireless infrastructure.

17. The system as claimed in claim 15, wherein the detection due to Wi-Fi network connectivity is based on a Service Set Identifier (SSID) broadcast by the Wi-Fi network.

18. The system as claimed in claim 14, wherein entering into a proximity range of a connectivity infrastructure in a pre-defined area comprising:
connecting to the wireless infrastructure for a first time visit,
negotiating with the wireless infrastructure (and not necessarily connect) for the subsequent visits,
receiving an authentication request along with a form from the service platform, and
sharing identification details in the form with the service platform.

19. The system as claimed in claim 14, wherein the device identity details comprise Media Access Control Address (MAC address) of the one or more electronic devices.

20. The system as claimed in claim 14, wherein the communication channels comprise at least one of a Short Message Service (SMS) mode message communication and an app mode message communication (Push Notification), an email mode message communication, API based communication and the like.

21. The system as claimed in claim 20, wherein the app mode message communication comprises checking and detecting the version of the app while sending the app mode message communication.

22. The system as claimed in claim 14, wherein the connection is established with the service platform to:
detect the one or more electronic devices through one or more Access Points (APs) in the Wi-Fi network, based on the identification details stored during the detection;
identify a repeated electronic device from the one or more electronic devices, wherein the repeated electronic device is identified according to the availability of the identification details; and
apply a filtering mechanism to optionally deny Wi-Fi connectivity to repeated electronic devices while providing a Wi-Fi connectivity support.

23. The system as claimed in claim 14, comprising:
collecting identification details of one or more electronic devices in bulk, and detecting the presence of the one or more electronic devices in the pre-defined area based on the pre-stored identification details of the one or more electronic devices and sending the notifications to the one or more electronic devices.

24. The system of claim 14, wherein authentication attributes include user details like mobile number, email address, User App Identity and the like and optionally include first name, last name, title, age, gender, business related tags and the like.

25. The system of claim 14 wherein, the user app identity refers to the actual identifier assigned to the app by the respective platforms like android, IOS and the like.

26. The system of claim 14, wherein the user app identity is designated by the OS (android, IOS, Windows etc.,) to a specific app in a specific device.

* * * * *